No. 646,789. Patented Apr. 3, 1900.
E. F. BAUERLE.
WHIFFLETREE ATTACHMENT.
(Application filed Sept. 7, 1899.)

(No Model.)

WITNESSES:
Geo. W. Naylor
Isaac B. Owens

INVENTOR
E. F. Bauerle
BY Munn & Co
ATTORNEYS

THE NORRIS PETERS CO., PHOTO-LITHO., WASHINGTON, D. C.

UNITED STATES PATENT OFFICE.

ERNST FRIEDRICH BAUERLE, OF STRONG CITY, KANSAS, ASSIGNOR TO HIMSELF AND PATRICK J. NORTON, OF SAME PLACE.

WHIFFLETREE ATTACHMENT.

SPECIFICATION forming part of Letters Patent No. 646,789, dated April 3, 1900.

Application filed September 7, 1899. Serial No. 729,728. (No model.)

*To all whom it may concern:*

Be it known that I, ERNST FRIEDRICH BAUERLE, of Strong City, in the county of Chase and State of Kansas, have invented a new and Improved Whiffletree Attachment, of which the following is a full, clear, and exact description.

The purpose of the invention is to provide means for preventing the falling of the reins beneath the singletrees, the invention being adapted particularly to use in connection with pairs or teams of horses.

This specification is the disclosure of one form of my invention, while the claims define the actual scope thereof.

Reference is to be had to the accompanying drawings, forming a part of this specification, in which similar characters of reference indicate corresponding parts in both the views.

Figure 1:
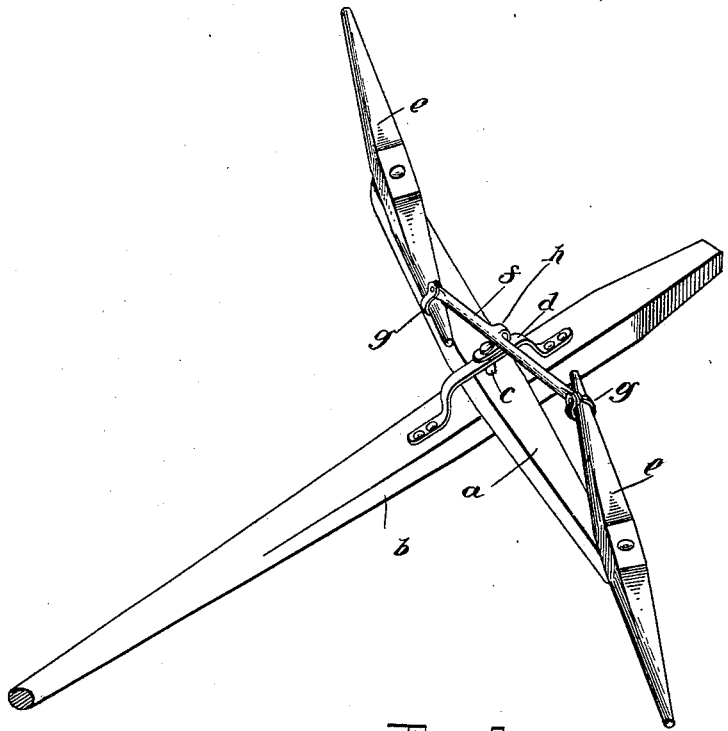
Figure 2:
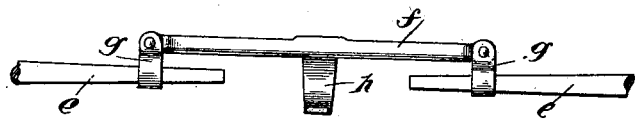

Figure 1 is a perspective view of the invention in use, and Fig. 2 is an enlarged side elevation of the attachment.

As shown in Fig. 1, the whiffletree $a$ is attached to the pole $b$ by means of the usual bolt $c$, fast with a bracket $d$, fastened to the pole.

The singletrees $e$ are mounted on the whiffletree as usual, and the arrangement for preventing the reins from falling between the singletrees consists in a connecting-bar $f$ with clips $g$ at its ends, the clips loosely receiving the contiguous ends of the singletrees and the bar extending transversely of the pole from one singletree to the other. The bar is provided with a lug $h$, fastened to or otherwise in connection with the bar $f$ at the middle thereof. This lug is preferably curved in the manner shown and is pivoted on the bracket $d$ by the bolt $c$ above mentioned.

With this attachment the singletrees are allowed all desired freedom of movement; but the reins are prevented from falling down between and beneath the singletrees by the bar $f$, which is also extended between the singletrees, and therefore cuts off the passage through which the reins might otherwise pass.

Having thus described my invention, I claim as new and desire to secure by Letters Patent—

1. The combination with a pole, the whiffletree, the bracket and bolt, of singletrees mounted on the whiffletrees, a connecting-bar, clips at the ends of the connecting-bar, the clips loosely receiving the contiguous ends of the singletrees and the connecting-bar extending transversely of the pole between the single-trees, and a lug attached to the middle of the connecting-bar and pivotally mounted on the bolt.

2. The combination with singletrees and means on which they are mounted, of a bar serving as a rein-guard, the bar being pivotally mounted on such means and having its ends respectively in slidable connection with the adjacent ends of the singletrees.

3. The combination with a whiffletree and singletrees mounted thereon, of a bar pivotally mounted coincident with the pivot of the whiffletree and having its ends respectively in sliding connection with the adjacent ends of the singletrees.

ERNST F. BAUERLE.

Witnesses:
GEO. W. CRUMB,
JOHN M. WARREN.